US011523177B2

(12) United States Patent
Sheppard et al.

(10) Patent No.: US 11,523,177 B2
(45) Date of Patent: *Dec. 6, 2022

(54) METHODS AND APPARATUS TO REPLICATE PANELISTS USING A LOCAL MINIMUM SOLUTION OF AN INTEGER LEAST SQUARES PROBLEM

(71) Applicant: The Nielsen Company (US), LLC, New York, NY (US)

(72) Inventors: Michael Sheppard, Holland, MI (US); Jonathan Sullivan, Hurricane, UT (US); Edward Murphy, North Stonington, CT (US); Michael D. Morgan, Bartlett, IL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/939,996

(22) Filed: Jul. 27, 2020

(65) Prior Publication Data

US 2020/0359090 A1 Nov. 12, 2020

Related U.S. Application Data

(63) Continuation of application No. 15/619,257, filed on Jun. 9, 2017, now Pat. No. 10,728,614.

(Continued)

(51) Int. Cl.
*H04N 21/258* (2011.01)
*H04N 21/442* (2011.01)
(Continued)

(52) U.S. Cl.
CPC . *H04N 21/44213* (2013.01); *H04N 21/25883* (2013.01); *H04N 21/4667* (2013.01); *H04N 21/262* (2013.01); *H04N 21/812* (2013.01)

(58) Field of Classification Search
CPC ....... H04N 21/44213; H04N 21/25883; H04N 21/4667; H04N 21/262; H04N 21/812
See application file for complete search history.

(56) References Cited

U.S. PATENT DOCUMENTS

| | | | |
|---|---|---|---|
| 5,956,692 A | 9/1999 | Foley | |
| 6,460,025 B1 | 10/2002 | Fohn et al. | |
| | (Continued) | | |

FOREIGN PATENT DOCUMENTS

| | | |
|---|---|---|
| JP | 2015529870 | 10/2015 |
| WO | 2014210597 | 12/2014 |

OTHER PUBLICATIONS

Huckett et al., "Combining Methods to Create Synthetic Microdata: Quantile Regression, Hot Deck, and Rank Swapping," Research Gate, Apr. 2008, 11 pages.

(Continued)

*Primary Examiner* — Nasser M Goodarzi
*Assistant Examiner* — Adil Ocak
(74) *Attorney, Agent, or Firm* — Hanley, Flight & Zimmerman, LLC

(57) ABSTRACT

Example methods and apparatus to replicate panelists using a local minimum solution of an integer least squares problem are disclosed. An example apparatus includes memory; and processor circuitry to execute computer readable instructions to: determine weight adjustments based on a ratio of (A) a first dot product of (i) attribute data and (ii) a difference between first aggregate panelist data and second seed panelist data, and (B) a second dot product of the attribute data and the attribute data, the first aggregate panelist data based on the attribute data, the attribute data corresponding to a seed panel; determine weight estimates based on the weight adjustments, the weight estimates to replicate respective seed panelists in the seed panel; and replicate respective ones of the seed panelists based on the (Continued)

weight estimates to generate a synthetic audience representative of return path data reported by a plurality of media devices.

20 Claims, 5 Drawing Sheets

Related U.S. Application Data

(60) Provisional application No. 62/464,927, filed on Feb. 28, 2017.

(51) Int. Cl.
*H04N 21/466* (2011.01)
*H04N 21/81* (2011.01)
*H04N 21/262* (2011.01)

(56) References Cited

U.S. PATENT DOCUMENTS

| | | |
|---|---|---|
| 6,775,663 B1 | 8/2004 | Kim |
| 7,197,472 B2 | 3/2007 | Conkwright et al. |
| 7,746,272 B2 | 6/2010 | Vollath |
| 7,865,916 B2 | 1/2011 | Beser et al. |
| 7,954,120 B2 | 5/2011 | Roberts et al. |
| 8,087,041 B2 | 12/2011 | Fu et al. |
| 8,112,301 B2 | 2/2012 | Harvey et al. |
| 8,149,162 B1 | 4/2012 | Pauls |
| 8,185,456 B2 | 5/2012 | LeClair et al. |
| 8,200,693 B2 | 6/2012 | Steele et al. |
| 8,423,406 B2 | 4/2013 | Briggs |
| 8,453,173 B1 | 5/2013 | Anderson et al. |
| 8,619,892 B2 | 12/2013 | Vetter et al. |
| 8,874,652 B1 | 10/2014 | Pecjak et al. |
| 8,973,023 B1 | 3/2015 | Rao et al. |
| 9,070,139 B2 | 6/2015 | Zhang |
| 9,111,186 B2 | 8/2015 | Blasinski et al. |
| 9,224,094 B2 | 12/2015 | Oliver et al. |
| 9,236,962 B2 | 1/2016 | Hawkins et al. |
| 9,420,320 B2 | 8/2016 | Doe |
| 9,529,836 B1 | 12/2016 | Hale |
| 10,045,057 B2 | 8/2018 | Shah et al. |
| 10,070,166 B2 | 9/2018 | Chaar et al. |
| 10,313,752 B2 | 6/2019 | Rao et al. |
| 10,491,696 B2 | 11/2019 | Gierada |
| 10,602,224 B2 | 3/2020 | Sullivan et al. |
| 10,728,614 B2* | 7/2020 | Sheppard ......... H04N 21/25883 |
| 10,856,027 B2 | 12/2020 | Sheppard et al. |
| 11,115,710 B2 | 9/2021 | Sheppard et al. |
| 11,140,449 B2 | 10/2021 | Sullivan et al. |
| 11,216,834 B2 | 1/2022 | Sheppard et al. |
| 11,323,772 B2 | 5/2022 | Sheppard et al. |
| 2002/0123928 A1 | 9/2002 | Eldering et al. |
| 2003/0037041 A1* | 2/2003 | Hertz ................ H04N 7/17318 |
| 2004/0001538 A1 | 1/2004 | Garrett |
| 2004/0059549 A1 | 3/2004 | Kropaczek et al. |
| 2006/0190318 A1 | 8/2006 | Downey et al. |
| 2007/0087756 A1 | 4/2007 | Hoffberg |
| 2008/0028006 A1 | 1/2008 | Liu et al. |
| 2008/0228543 A1 | 9/2008 | Doe |
| 2008/0300965 A1 | 12/2008 | Doe |
| 2008/0313017 A1 | 12/2008 | Totten |
| 2010/0161385 A1 | 6/2010 | Karypis et al. |
| 2010/0191723 A1* | 7/2010 | Perez .................... G06Q 30/02 707/723 |
| 2011/0196733 A1 | 8/2011 | Li et al. |
| 2012/0023522 A1 | 1/2012 | Anderson et al. |
| 2012/0052930 A1 | 3/2012 | McGucken |
| 2012/0066410 A1 | 3/2012 | Stefanakis et al. |
| 2012/0072940 A1* | 3/2012 | Fuhrer .................. H04H 60/45 725/13 |
| 2012/0110027 A1 | 5/2012 | Falcon |
| 2012/0254911 A1 | 10/2012 | Doe |
| 2013/0138743 A1 | 5/2013 | Amento et al. |
| 2013/0198125 A1 | 8/2013 | Oliver et al. |
| 2013/0254787 A1 | 9/2013 | Cox et al. |
| 2013/0290233 A1* | 10/2013 | Ferren .................. H04N 21/632 706/46 |
| 2013/0339991 A1 | 12/2013 | Ricci |
| 2013/0346033 A1 | 12/2013 | Wang et al. |
| 2014/0101685 A1 | 4/2014 | Kitts et al. |
| 2014/0112557 A1 | 4/2014 | Santamaria-Pang et al. |
| 2014/0278933 A1 | 9/2014 | McMillan |
| 2014/0280891 A1 | 9/2014 | Doe |
| 2014/0337104 A1 | 11/2014 | Splaine et al. |
| 2014/0358676 A1 | 12/2014 | Srivastava et al. |
| 2015/0180989 A1 | 6/2015 | Seth |
| 2015/0186403 A1 | 7/2015 | Srivastava et al. |
| 2015/0332310 A1 | 11/2015 | Cui et al. |
| 2016/0012314 A1 | 1/2016 | Ramamurthy et al. |
| 2016/0086208 A1 | 3/2016 | Oliver et al. |
| 2016/0134934 A1 | 5/2016 | Jared et al. |
| 2016/0162955 A1 | 6/2016 | O'Kelley et al. |
| 2016/0165277 A1 | 6/2016 | Kirillov et al. |
| 2016/0232563 A1 | 8/2016 | Perez et al. |
| 2016/0249098 A1 | 8/2016 | Pecjak et al. |
| 2016/0269783 A1 | 9/2016 | Mowrer et al. |
| 2016/0323616 A1 | 11/2016 | Doe |
| 2016/0373820 A1 | 12/2016 | Meyer et al. |
| 2016/0379246 A1 | 12/2016 | Sheppard et al. |
| 2017/0006342 A1 | 1/2017 | Nagaraja Rao et al. |
| 2017/0155956 A1 | 6/2017 | Nagaraja Rao et al. |
| 2017/0187478 A1 | 6/2017 | Shah et al. |
| 2017/0213243 A1 | 7/2017 | Dollard |
| 2017/0300911 A1 | 10/2017 | Alnajem |
| 2018/0073933 A1* | 3/2018 | Keskin ............... G05D 23/1917 |
| 2018/0225709 A1 | 8/2018 | Ferber et al. |
| 2018/0249208 A1 | 8/2018 | Sheppard et al. |
| 2018/0249214 A1 | 8/2018 | Sullivan et al. |
| 2019/0147461 A1 | 5/2019 | Sheppard et al. |
| 2019/0354574 A1 | 11/2019 | Wick et al. |
| 2019/0356950 A1 | 11/2019 | Sheppard et al. |
| 2020/0120387 A1 | 4/2020 | Sheppard et al. |
| 2020/0204863 A1 | 6/2020 | Sullivan et al. |
| 2020/0294069 A1 | 9/2020 | Sheppard et al. |
| 2020/0296441 A1 | 9/2020 | Sheppard et al. |
| 2021/0014564 A1 | 1/2021 | Sheppard et al. |
| 2021/0058659 A1 | 2/2021 | Sheppard et al. |
| 2021/0133773 A1 | 5/2021 | Sheppard et al. |
| 2021/0319002 A1 | 10/2021 | Ryan et al. |
| 2021/0319474 A1 | 10/2021 | Sheppard et al. |
| 2022/0038781 A1 | 2/2022 | Sullivan et al. |
| 2022/0058667 A1 | 2/2022 | Sheppard et al. |
| 2022/0122104 A1 | 4/2022 | Sheppard et al. |
| 2022/0159326 A1 | 5/2022 | Sheppard et al. |

OTHER PUBLICATIONS

Golub et al., "Linear Least Squares and Quadratic Programming," Technical Report No. CS 134, Stanford University, Computer Science Department, May 1969, 38 pages.
Charles L. Byrne, "Iterative Algorithms in Inverse Problems," Apr. 25, 2006, 347 pages.
Charles L. Byrne, "Applied Iterative Methods," Jan. 23, 2007, 396 pages.
Bourguignon et al., "On the Construction of Synthetic Panels," Oct. 2015, 42 pages.
Marno Verbeek, "Pseudo-Panels and Repeated Cross-Sections," The Econometrics of Panel Data, Springer-Verlag Berlin Heidelberg 2008, 15 pages.
P.J.G. Teunissen, "Least-Squares Estimation of the Integer GPS Ambiguities," Delft University of Technology, Department of the Geodetic Engineering, Aug. 1993, 16 pages.
United States Patent and Trademark Office, "Non-Final Office action" issued in connection with U.S. Appl. No. 15/445,543, dated Jan. 11, 2018, 19 pages.
United States Patent and Trademark Office, "Non-Final Office action" issued in connection with U.S. Appl. No. 15/445,530, dated Apr. 11, 2018, 10 pages.
United States Patent and Trademark Office, "Non-Final Office Action," issued in connection with U.S. Appl. No. 15/445,557, dated Jun. 29, 2018, 12 pages.

(56) References Cited

OTHER PUBLICATIONS

United States Patent and Trademark Office, "Non-Final Office action" issued in connection with U.S. Appl. No. 15/635,153, dated Feb. 5, 2018, 9 pages.
United States Patent and Trademark Office, "Notice of Allowance" issued in connection with U.S. Appl. No. 15/635,153, dated Jul. 23, 2018, 9 pages.
United States Patent and Trademark Office, "Final Office Action" issued in connection with U.S. Appl. No. 15/445,543, dated Aug. 3, 2018, 16 pages.
United States Patent and Trademark Office, "Non-Final Office Action," issued in connection with U.S. Appl. No. 15/619,257, dated Jun. 15, 2018, 16 pages.
United States Patent and Trademark Office, "Notice of Allowance," issued in connection with U.S. Appl. No. 15/635,153, dated Oct. 17, 2018, 5 pages.
United States Patent and Trademark Office, "Final Office Action" issued in connection with U.S. Appl. No. 15/445,557, dated Dec. 27, 2018, 10 pages.
United States Patent and Trademark Office, "Non-Final Office Action," issued in connection with U.S. Appl. No. 15/445,543, dated Jan. 8, 2019, 15 pages.
United States Patent and Trademark Office, "Notice of Allowance," issued in connection with U.S. Appl. No. 15/445,530, dated Jan. 2, 2019, 8 pages.
United States Patent and Trademark Office, "Final Office Action" issued in connection with U.S. Appl. No. 15/619,257, dated Jan. 18, 2019, 18 pages.
United States Patent and Trademark Office, "Notice of Allowance," issued in connection with U.S. Appl. No. 15/635,153, dated Mar. 21, 2019, 8 pages.
United States Patent and Trademark Office, "Notice of Allowability," issued in Connection with U.S. Appl. No. 15/635,153, dated Apr. 8, 2019, 2 pages.
United States Patent and Trademark Office, "Notice of Allowance," issued in connection with U.S. Appl. No. 15/445,557, dated Apr. 15, 2019, 8 pages.
United States Patent and Trademark Office, "Notice of Allowance," issued in connection with U.S. Appl. No. 15/445,530, dated May 3, 2019, 5 pages.
United States Patent and Trademark Office, "Notice of Allowability," issued in connection with U.S. Appl. No. 15/445,530, dated May 21, 2019, 2 pages.
United States Patent and Trademark Office, "Final Office Action" issued in connection with U.S. Appl. No. 15/445,543, dated Jul. 18, 2019, 12 pages.
United States Patent and Trademark Office, "Notice of Allowance," issued in connection with U.S. Appl. No. 15/445,557, dated Jul. 26, 2019, 7 pages.
United States Patent and Trademark Office, "Notice of Allowance," issued in connection with U.S. Appl. No. 15/445,557, dated Nov. 5, 2019, 9 pages.
United States Patent and Trademark Office, "Notice of Allowance," issued in connection with U.S. Appl. No. 15/445,530, dated Sep. 25, 2019, 5 pages.
Haggin, Patience et al., "Google Nears a Long-Tipped Limit on Tracking "Cookies,"in Blow to Rivals," The Wall Street Journal, May 6, 2019, obtained from https://www.wsj.com/articles/googles-new-privacy-tools-to-make-cookies-crumble-competitors-stumble-11557151913, 3 pages.
United States Patent and Trademark Office, "Notice of Allowance," issued in connection with U.S. Appl. No. 15/445,530, dated Jan. 31, 2020, 10 pages.
International Searching Authority. "International Search Report & Written Opinion", issued in connection with application No. PCT/US2020/022436 dated Jul. 6, 2020, 9 pages.
International Searching Authority. "International Search Report & Written Opinion", issued in connection with application No. PCT/US2020/02243 8 dated Jul. 6, 2020, 10 pages.
United States Patent and Trademark Office, "Non-Final Office Action," issued in connection with U.S. Appl. No. 16/526,747, dated Jul. 23, 2020, 8 pages.
United States Patent and Trademark Office, "Notice of Allowance" issued in connection with U.S. Appl. No. 15/619,257, dated Nov. 5, 2019, 8 pages.
United States Patent and Trademark Office, "Notice of Allowance" issued in connection with U.S. Appl. No. 15/619,257, dated Mar. 17, 2020, 8 pages.
United States Patent and Trademark Office, "Final Office Action," issued in connection with U.S. Appl. No. 16/526,747, dated Dec. 30, 2020, 9 pages.
United States Patent and Trademark Office, "Non-Final Office Action," issued in connection with U.S. Appl. No. 16/355,386, dated Nov. 9, 2020, 9 pages.
United States Patent and Trademark Office, "Non-Final Office Action," issued in connection with U.S. Appl. No. 16/657,652, dated Oct. 27, 2020, 18 pages.
United States Patent and Trademark Office, "Notice of Allowance," issued in connection with U.S. Appl. No. 16/355,393, dated Jul. 8, 2020, 8 pages.
United States Patent and Trademark Office, "Non-Final Office Action," issued in connection with U.S. Appl. No. 16/893,129, dated Apr. 13, 2021, 9 pages.
United States Patent and Trademark Office, "Notice of Allowance," issued in connection with U.S. Appl. No. 16/526,747, dated Apr. 28, 2021, 8 pages.
United States Patent and Trademark Office, "Final Office Action," issued in connection with U.S. Appl. No. 16/355,386, dated May 4, 2021, 11 pages.
United States Patent and Trademark Office, "Notice of Allowance," issued in connection with U.S. Appl. No. 16/805,361, dated Feb. 18, 2021, 9 pages.
United States Patent and Trademark Office, "Final Office Action," issued in connection with U.S. Appl. No. 16/657,652, dated May 14, 2021, 19 pages.
United States Patent and Trademark Office, "Non-Final Office Action," issued in connection with U.S. Appl. No. 16/843,650, dated May 26, 2021, 26 pages.
United States Patent and Trademark Office, "Corrected Notice of Allowability," issued in connection with U.S. Appl. No. 16/526,747, dated Aug. 11, 2021, 3 pages.
United States Patent and Trademark Office, "Advisory Action," issued in connection with U.S. Appl. No. 16/657,652, dated Aug. 19, 2021, 5 pages.
United States Patent and Trademark Office, "Notice of Allowance," issued in connection with U.S. Appl. No. 16/893,129, dated Jul. 29, 2021, 5 pages.
United States Patent and Trademark Office, "Notice of Allowance," issued in connection with U.S. Appl. No. 16/355,386, dated Aug. 30, 2021, 7 pages.
United States Patent and Trademark Office, "Notice of Allowance," issued in connection with U.S. Appl. No. 16/805,361, dated Jun. 3, 2021, 8 pages.
United States Patent and Trademark Office, "Non-Final Office Action," issued in connection with U.S. Appl. No. 16/657,652, dated Oct. 18, 2021, 22 pages.
International Searching Authority. "International Preliminary Report on Patentability", issued in connection with application No. PCT/US2020/022438 dated Sep. 16, 2021, 6 pages.
International Searching Authority. "International Preliminary Report on Patentability", issued in connection with application No. PCT/US2020/022436 dated Sep. 16, 2021, 5 pages.
United States Patent and Trademark Office, "Non-Final Office Action," issued in connection with U.S. Appl. No. 17/093,460, dated Oct. 22, 2021, 5 pages.
United States Patent and Trademark Office, "Non-Final Office Action," issued in connection with U.S. Appl. No. 16/676,158, dated Nov. 29, 2021, 24 pages.
United States Patent and Trademark Office, "Notice of Allowance," issued in connection with U.S. Appl. No. 16/893,129, dated Dec. 14, 2021, 5 pages.

(56) References Cited

OTHER PUBLICATIONS

United States Patent and Trademark Office, "Corrected Notice of Allowbility," issued in connection with U.S. Appl. No. 16/355,386, dated Dec. 9, 2021, 2 pages.

United States Patent and Trademark Office, "Final Office Action," issued in connection with Application No. U.S. Appl. No. 16/843,650, dated Dec. 17, 2021, 33 pages.

United States Patent and Trademark Office, "Notice of Allowance and Fee(s) Due," issued in connection with U.S. Appl. No. 17/093,460, dated Mar. 1, 2022, 9 pages.

United States Patent and Trademark Office, "Non-Final Office Action," issued in connection with U.S. Appl. No. 17/408,208 , dated Jan. 5, 2022, 21 pages.

United States Patent and Trademark Office, "Non-Final Office Action," issued in connection with U.S. Appl. No. 17/099,510, dated Mar. 29, 2022, 6 pages.

United States Patent and Trademark Office, "Non-Final Office Action," issued in connection with U.S. Appl. No. 16/676,158, dated Mar. 18, 2022, 29 pages.

United States Patent and Trademark Office, "Corrected Notice of Allowability," issued in connection with U.S. Appl. No. 16/893,129, dated Apr. 8, 2022, 2 pages.

United States Patent and Trademark Office, "Notice of Allowance and Fee(s) Due," issued in connection with U.S. Appl. No. 16/657,652, dated Apr. 12, 2022, 8 pages.

United States Patent and Trademark Office, "Final Office Action," issued in connection with U.S. Appl. No. 17/408,208, dated Apr. 20, 2022, 26 pages.

Esch et al., "Appendix 8 Numerical Methods for Solving Nonlinear Equations," Asset and Risk Management: Risk Oriented Finance, published 2005 by John Wiley & Sons Ltd., 7 pages.

International Searching Authority. "International Search Report & Written Opinion," issued in connection with application No. PCT/US21/26010 dated Jul. 26, 2021, 8 pages.

United States Patent and Trademark Office, "Notice of Allowance and Fee(s) Due," issued in connection with U.S. Appl. No. 17/493,653, dated Apr. 29, 2022, 8 pages.

United States Patent and Trademark Office, "Supplemental Notice of Allowability," issued in connection with U.S. Appl. No. 17/493,653, dated May 26, 2022, 2 pages.

United States Patent and Trademark Office, "Supplemental Notice of Allowability," issued in connection with U.S. Appl. No. 16/657,652, dated Jul. 29, 2022, 3 pages.

United States Patent and Trademark Office, "Non-Final Office Action," issued in connection with U.S. Appl. No. 16/843,650, dated Jul. 29, 2022, 36 pages.

United States Patent and Trademark Office, "Final Office Action," issued in connection with U.S. Appl. No. 16/676,158, dated Jul. 29, 2022, 30 pages.

United States Patent and Trademark Office, "Notice of Allowance and Fee(s) Due," issued in connection with U.S. Appl. No. 17/093,460, dated Jun. 10, 2022, 9 pages.

\* cited by examiner

METHODS AND APPARATUS TO REPLICATE PANELISTS USING A LOCAL MINIMUM SOLUTION OF AN INTEGER LEAST SQUARES PROBLEM

RELATED APPLICATIONS

This patent arises from a continuation of U.S. patent application Ser. No. 15/619,257, filed on Jun. 9, 2017, titled "METHODS AND APPARATUS TO REPLICATE PANELISTS USING A LOCAL MINIMUM SOLUTION OF AN INTEGER LEAST SQUARES PROBLEM," which claims the benefit of U.S. Provisional Patent Application Ser. No. 62/464,927, filed on Feb. 28, 2017, titled "METHODS AND APPARATUS TO REPLICATE PANELISTS USING A LOCAL MINIMUM SOLUTION OF AN INTEGER LEAST SQUARES PROBLEM." Priority to U.S. patent application Ser. No. 15/619,257 and U.S. Provisional Patent Application Ser. No. 62/464,927 is hereby claimed. U.S. patent application Ser. No. 15/619,257 and U.S. Provisional Patent Application Ser. No. 62/464,927 are hereby incorporated herein by reference in their respective entireties.

FIELD OF THE DISCLOSURE

This disclosure relates generally to media audience measurement, and, more particularly, to methods and apparatus to replicate panelists using a local minimum solution of an integer least squares problem.

BACKGROUND

Determining a size and demographic of an audience of a media presentation helps media providers and distributors schedule programming and determine a price for advertising presented during the programming. In addition, accurate estimates of audience demographics enable advertisers to target advertisements to certain types and sizes of audiences. To collect these demographics, an audience measurement entity enlists a plurality of media consumers (often called panelists) to cooperate in an audience measurement study (often called a panel) for a predefined length of time. In some examples, the audience measurement entity obtains (e.g., directly, or indirectly via a service provider) return path data from media presentation devices (e.g., set-top boxes) that identifies tuning data from the media presentation device. In such examples, the audience measurement entity models and/or assigns viewers based on the return path data. The media consumption habits and demographic data associated with these enlisted media consumers are collected and used to statistically determine the size and demographics of the entire audience of the media presentation. In some examples, this collected data (e.g., data collected via measurement devices) may be supplemented with survey information, for example, recorded manually by the presentation audience members.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
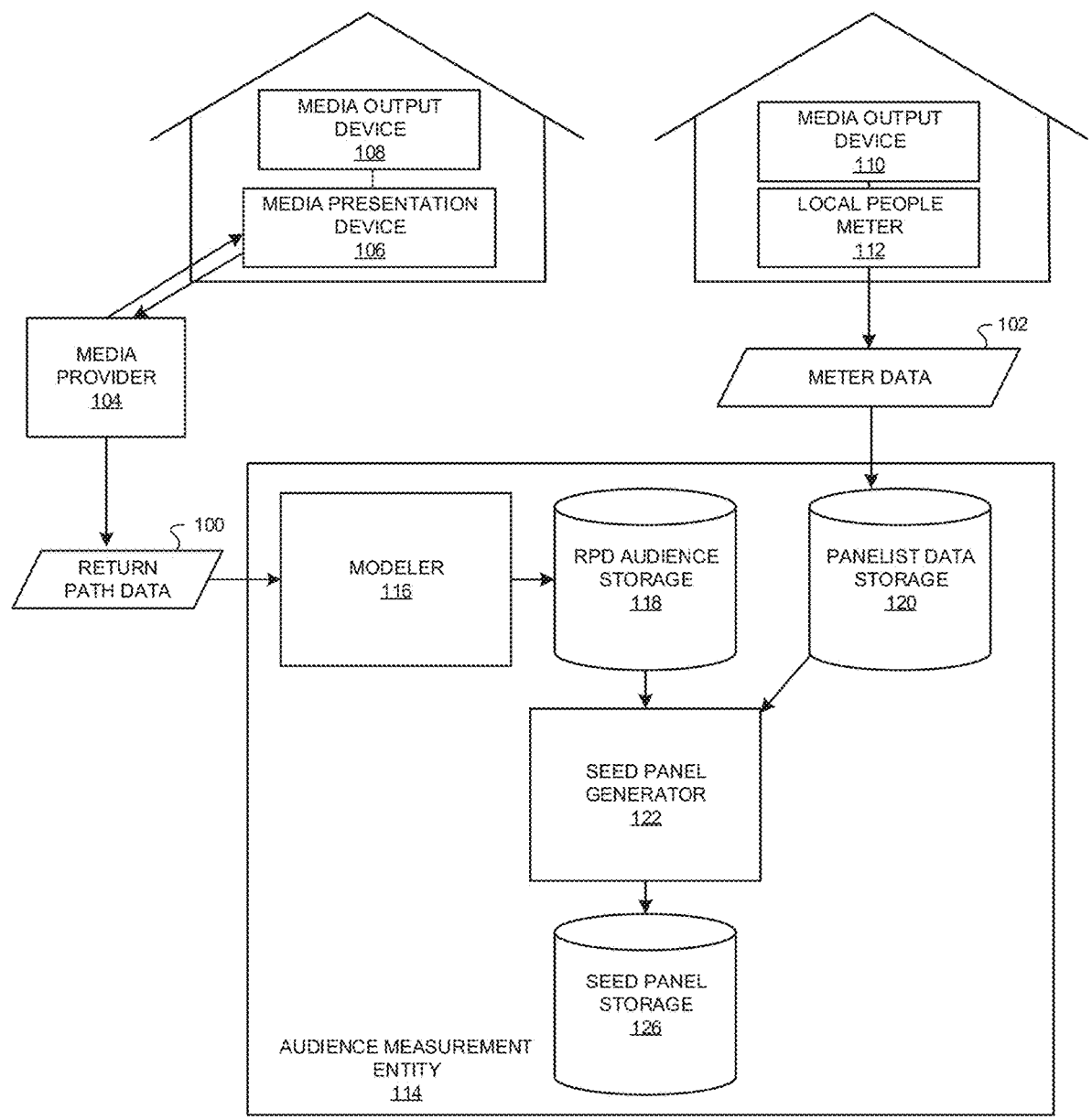
FIG. 1 is a block diagram of an example environment in which return path data and meter data are collected from media presentation locations and are analyzed by an example audience measurement entity to generate an example seed panel and generate example synthetic respondent level data based on the example seed panel.

Audience measurement entities seek to understand the composition and size of audiences of media, such as television programming. Such information allows audience measurement entity researchers to, for example, report advertising delivery and/or targeting statistics to advertisers that target their media (e.g., advertisements) to particular audiences. Additionally, such information helps to establish advertising prices commensurate with audience exposure and demographic makeup (referred to herein collectively as "audience configuration"). One way to gather media presentation information is to gather media presentation information from media output devices (e.g., gathering television presentation data from a set-top box (STB) connected to a television). As used herein, media presentation includes media output by a media device regardless of whether or not an audience member is present (e.g., media output by a media output device at which no audience is present, media exposure to an audience member(s), etc.).

A media presentation device (e.g., STB) provided by a service provider (e.g., a cable television service provider, a satellite television service provider, an over the top service provider, a music service provider, a movie service provider, a streaming media provider, etc.) or purchased by a consumer may contain processing capabilities to monitor, store, and transmit tuning data (e.g., which television channels are tuned by the media presentation device at a particular time) to an audience measurement entity (e.g., The Nielsen Company (US), LLC.) to analyze media presentation activity. Data transmitted from a media presentation device back to a service provider providing the media (which may then aggregate and provide the return path data to an audience measurement entity) is herein referred to as return path data. Return path data includes tuning data. Tuning data is based on data received from the media presentation device while the media presentation device is on (e.g., powered on, switched on, and/or tuned to a media channel, streaming, etc.). Although return path data includes tuning data, return path data may not include data (e.g., demographic data) related to the user viewing the media corresponding to the media presentation device. Accordingly, return path data may not be associated with particular viewers, demographics, locations, etc.

To determine aspects of media presentation data (e.g., which household member is currently consuming a particular media and the demographics of that household member), market researchers may perform audience measurement by enlisting a subset of the media consumers as panelists. Panelists or monitored panelists are audience members (e.g., household members, users, panelists, etc.) enlisted to be monitored, who divulge and/or otherwise share their media activity and/or demographic data to facilitate a market research study. An audience measurement entity typically monitors media presentation activity (e.g., viewing, listening, etc.) of the monitored panelists via audience measurement system(s), such as a metering device(s) and/or a local people meter (LPM). Audience measurement typically includes determining the identity of the media being presented on a media output device (e.g., a television, a radio, a computer, etc.), determining data related to the media (e.g., presentation duration data, timestamps, channel data, etc.), determining demographic information of an audience, and/or determining which members of a household are associated with (e.g., have been exposed to) a media presentation. For example, an LPM in communication with an audience measurement entity communicates audience measurement (e.g., metering) data to the audience measurement entity. As used herein, the phrase "in communication," including variances thereof, encompasses direct communication and/or indirect communication through one or more intermediary components and does not require direct physical (e.g., wired) communication and/or constant communication, but rather additionally includes selective communication at periodic or aperiodic intervals, as well as one-time events.

In some examples, metering data (e.g., including media presentation data) collected by an LPM or other meter is stored in a memory and transmitted via a network, such as the Internet, to a datastore managed by the audience measurement entity. Typically, such metering data is combined with additional metering data collected from a plurality of LPMs monitoring a plurality of panelist households. The metering data may include, but are not limited to, a number of minutes a household media presentation device was tuned to a particular channel, a number of minutes a household media presentation device was used (e.g., consumed) by a household panelist member and/or a visitor (e.g., a presentation session), demographics of the audience (which may be statistically projected based on the panelist data), information indicative of when the media presentation device is on or off, and/or information indicative of interactions with the media presentation device (e.g., channel changes, station changes, volume changes, etc.), etc. As used herein, a channel may be a tuned frequency, selected stream, an address for media (e.g., a network address), and/or any other identifier for a source and/or carrier of media.

Return path data provides valuable media exposure data, including media exposure data in locations where no panel data is available. However, return path data typically contains tuning data in the aggregate. Accordingly, return path data usually does not include respondent level data such as, but not limited to, detailed data relating to audience demographics and/or viewing data broken up into margins (e.g., quarter hours). Examples disclosed herein alleviate the lack of respondent level data in return path data by leveraging the respondent level data obtained from a panel of monitored panelists. Using examples disclosed herein, synthetic respondent level data corresponding to a group of synthetic, or virtual, panelists may be generated to correspond to the return path data, thereby increasing the value of return path data to a customer (e.g., of an advertising company).

Examples disclosed herein process the collected and/or aggregated metering data for markets where a panel is maintained and collect and/or aggregate return path data for markets where a panel is not maintained to generate a seed panel. A seed panel is a synthetic panel including monitored panelists and non-panelist selected to correspond to return path data homes (e.g., in-market return path data) and regional panel homes (e.g., over the air only panelists) and used as the basis for generation of synthetic respondent level data (e.g., representative of a group synthetic/virtual panelists) based on a similarity to the segment of the market that is not covered by the return path data. These monitored panelists are selected from a panel (e.g., a national panel of metered users) based on a regional proximity to a designated market area, a similarity between demographics of the monitored panelist and demographics of the return path data audience location, household media characteristics (e.g., how the households receive television signals (cable, satellite, over-the-air radio, etc.)), a similarity between media consumption of the monitored panelists and the return path data audience, etc. As used herein, a return path data audience is viewer assigned return path data associated with a population (e.g., a universe or users) and/or location. As used herein, a seed panelist is a monitored panelist that has been selected to be included in a seed panel. As used herein, synthetic respondent level data or respondent level data is processed viewing data at the level of individual respondents. Synthetic respondent level data may include complete time records (e.g., at the quarter hour level, hour level, etc.) across each broadcasting day of all viewing session by every family member and guest on all metered media output devices in a home including the demographic data. As used herein, designated market area is a geographical area that defines a media market where synthetic respondent level data is produced.

During the generation of the seed panel, individual monitored panelists may need to be replicated to satisfy certain constraints and/or to adjust the degrees of freedom of the seed panel. Accordingly, examples disclosed herein replicate individual monitored panelists to form an initial seed panel. The respective viewing behavior of the replicated seed panelists can be modified slightly within each replication to form a final synthetic/virtual panel. Any appropriate subsequent processing techniques or techniques can then be used to adjust the viewing behavior of the replicated panelists to further meet desired targets. The initial replication corresponds to the solution to a constraint system (e.g., $AX=B$, where A represents the individual monitored panelists used to form the seed panel, B represents the seed panel aggregate data, and X are weights that are used for replicating the individual monitored to from the initial seed panel). Traditional techniques to solve the above system cannot be computed for large systems with a large number of panelists and/or constraints. Examples disclosed herein determine the replication values/weights (X) using an iterative process that is able to solve such large systems without running into processor resource and/or memory problems. Examples disclosed here can replicate panelist without solving a system of equations, performing matrix multiplication, or invoking non-linear optimization procedures. Rather, examples disclosed herein iteratively adjust weights for each panelist until the error associated with such adjusted weights is reduced to an acceptable level, likely corresponding to a local minimum solution. In this manner, examples disclosed herein are able to compute weights representative of duplication factors for thousands of panelists with millions of constraints.

FIG. 1 is a block diagram of an environment in which example return path data 100 and example meter data 102 are collected to generate synthetic respondent level data based on a generated seed panel. FIG. 1 includes the example return path data 100, the example meter data 102, an example media provider 104, an example media presentation device 106, example media output devices 108, 110, an example local people meter (LPM) 112, and an example audience measurement entity (AME) 114. The example audience measurement entity 114 includes an example modeler 116, an example return path data (RPD) audience storage 118, an example panelist data storage 120, an example seed panel generator 122, an example station data storage 124, an example seed panel storage 126, an example seed panel optimizer 128, and an example output file 130.

The example media provider 104 of FIG. 1 is a service provider (e.g., cable media service provider, a radio frequency (RF) media provider, a satellite media service provider, etc.) that presents media to an audience member via the example media presentation device 106. The media provided by the example media provider 104 is transmitted (e.g., via a wired or wireless network connection) to the media presentation device 106. The media presentation device 106 is connected, via a wired or wireless connection, to the example media output device 108 to output the media to an audience member. The media output device 108 is a device capable of outputting the received media. For example, the media output device 108 may be a television, a radio, speakers, a projector, a computer, a computing device, a tablet, a mobile device, and/or any other device capable of outputting media.

When the example media presentation device 106 of FIG. 1 is on, the media presentation device 106 receives media corresponding to a station, program, website, etc. based on the tuning of the example media presentation device 106. For example, the media presentation device 106 may be a set-top box. Additionally or alternatively, the example media presentation device 106 may be an over the top device, a video game console, a digital video recorder (DVR), a digital versatile disc (DVD) player, a receiver, a router, a server, a computer, a mobile device, a smart television, and/or any device that receives media from a service provider. In some examples, the media presentation device 106 may implement a DVR and/or DVD player. In some examples, the example media presentation device 106 includes a unique serial number that, when associated with subscriber information, allows an audience measurement entity, a marketing entity, and/or any other entity to ascertain specific subscriber behavior information.

By way of example, the example media presentation device 106 may be tuned to channel 5. In such an example, the media presentation device 106 outputs media (from the example media provider 104) corresponding to the tuned channel 5. The media presentation device 106 may gather tuning data corresponding to which channels, stations, websites, etc. that the example media presentation device 106 was tuned. The example media presentation device 106 generates and transmits the example return path data 100 to the example media provider 104. The example return path data 100 includes the tuning data and/or data corresponding to the example media provider 104 (e.g., data in the aggregate). Although the illustrated example of FIG. 1 includes the example media provider 104 receiving the example return path data 100 from one media presentation device (e.g., the example media presentation device 106), at one location, corresponding to one media provider (e.g., the example media provider 104), the example media provider 104 may receive return path data 100 from any number or type(s) of media presentation devices, at any number of locations. The media provider 104 transmits the collected return path data 100 to the example audience measurement entity 114. Additionally or alternatively, the audience measurement entity 114 may be hosted by any other entity or may be co-hosted by another entity(ies). For example, the example return path data 100 may be collected from the example media presentation devices 106 by a media provider (e.g., a cable television provider, a satellite television provider, etc.) and the example meter data 102 may be collected from an LPM (e.g., such as the example LPM 112) by the example audience measurement entity 114 cooperating with the media provider to gain access to the tuning data. The example audience measurement entity 114 includes the example return path data audience storage 118 (e.g., a database) and the example panelist data storage 120 (e.g., a database).

The example media output device 110 of FIG. 1 is a device capable of outputting the received media. For example, the media output device 110 may be a television, a radio, speakers, a projector, a computer, a computing device, a tablet, a mobile device, and/or any other device capable of outputting media. In some examples, the media output device 110 receives media over-the-air. In this manner, the media output device 110 receives media via an antenna and does not correspond to a media provider (e.g., including the example media provider 104). In the illustrated example of FIG. 1, the media output device 110 corresponds to one or more monitored panelists. The example LPM 112 monitors the panelists exposure to media output by the example media output device 110. For example, the example LPM 112 is in communication with the example media output device 110 to collect and/or capture signals emitted externally by the media output device 110. The LPM 112 may be coupled with the media output device 110 via wired and/or wireless connection. The example LPM 112 may be implemented in connection with additional and/or alternative types of media presentation devices, such as, for example, a radio, a computer monitor, a video game console, and/or any other device capable to present media to a user. The LPM 112 may be a portable people meter, a cell phone, a computing device, a sensor, and/or any other device capable of metering (e.g., monitoring) user exposure to media. In some examples, a media presentation location may include a plurality of LPMs 112. In such examples, the plurality of the LPMs 112 may be used to monitor media exposure for multiple users and/or media output devices 110. Additionally, the example panelist data storage 120 receives and stores the example meter data 102 from the example LPM 112.

In some examples, the example LPM 112 of FIG. 1 includes a set of buttons assigned to audience members to determine which of the audience members is watching the example media output device 110. The LPM 112 may periodically prompt the audience members via a set of LEDs, a display screen, and/or an audible tone, to indicate that the audience member is present at a first media presentation location by pressing an assigned button. In some examples, to decrease the number of prompts and, thus, the number of intrusions imposed upon the media consumption experience of the audience members, the LPM 112 prompts only when unidentified audience members are located at the first media presentation location and/or only after the LPM 112 detects a channel change and/or a change in state of the media output device 110. In other examples, the LPM 112 may include at least one sensor (e.g., a camera, 3-dimensional sensor, etc.) and/or be communicatively coupled to at least one sensor that detects a presence of the user in a first example media presentation location. The example LPM 112 transmits the example meter data 102 to a media researcher and/or a marketing entity. The example meter data 102 includes the media presentation data (e.g., data related to media presented while the media output device 110 is on and a user is present). The example meter data 102 may further include a household identification, a tuner key, a presentation start time, a presentation end time, a channel key, etc. Although the illustrated example illustrates the example audience measurement entity 114 collecting the example meter data 102 from one LPM 112 at one location, the example audience measurement entity 114 may collect meter data from any number or type of meters at any number of locations.

The example return path data 100 of FIG. 1 from the example media presentation device 106 and/or the example meter data 102 from the example LPM 112 is transmitted to the example audience measurement entity 114 via a network. The network may be implemented using any type of public or private network, such as, but not limited to, the Internet, a telephone network, a local area network (LAN), a cable network, and/or a wireless network. To enable communication via the network, the example media presentation device 106 includes a communication interface that enables a connection to an Ethernet, a digital subscriber line (DSL), a telephone line, a coaxial cable, or any wireless connection, etc.

The example modeler 116 of the example AME 114 of FIG. 1 collects the example return path data 100 corresponding to the example media presentation device(s) 106. As described above, the example return path data 100 includes tuning data of the example media presentation device 106. However, the example return path data 100 may not include specific data identifying any information relating to the audience of the example media output device 108. The example modeler 116 models such audience information. For example, the modeler 116 may assign and/or model virtual users to augment the example return path data 100, thereby generating audience (e.g., viewer or listener) assigned return path data. The example modeler 116 outputs the audience assigned return path data to the example return path data audience storage 118.

The example seed panel generator 122 of FIG. 1 gathers (A) the audience assigned return path data from the example return path data audience storage 118, (B) the example meter data 102 from the example panelist data storage 120, (C) and station data from the example station data storage 124 to generate a seed panel. As explained above, a seed panel is a panel including synthetic respondent level data from monitored panelists corresponding to the LPM(s) 112, which are selected based on a return path data audience and/or homes and regional panel audience and/or homes that are not covered by return path data. The seed panelists are selected to represent the entire market. The example seed panel generator 122 assigns geography and income data to the persons and/or homes corresponding to the audience assigned return path data and the meter data 102. The example seed panel generator 122 initiates the seed panel by selecting monitored panelists to be representative of the viewer/geography/income assigned return path data audience. For example, a monitored panelist may be selected based on a similarity between (A) the location of the monitored panelist and the location of a return path data audience member, (B) demographics corresponding to the location of the return path data audience member and the demographics of the monitored panelist, (C) media viewing characteristics of the return path data audience and the monitored panelist, etc.

The example station data storage 124 stores data related to station receivability by county. The example seed panel generator 122 uses the station data to calculate the station receivability for over the air homes. In some examples, the seed panel generator 122 filters the gathered seed panelists to collect attributes of interest at the person level and/or the household level. Attributes of interest at the person level may include age, gender, ethnicity, nationality, race, etc. and attributes at the household level may include head of household data, cable data, single set data, ADS data, county data, metro data, income, zip code, number of televisions, pay service data, etc. The example seed panel generator 122 weights the seed panelists according to the universe estimate(s) of the designated market area. The universe estimate is an estimate of the total number of users in a universe of users (e.g., total number of television viewers). In some examples, the universe estimate is broken down at the demographic level. In some examples, when out-of-tab seed panelists exist, the example seed panel generator 122 donates viewing based on a donor pool of seed panelists and/or monitored panelists of similar demographics. A seed panelist is out-of-tab when, for example, the panelist's LPM 112 is off, broken, and/or otherwise faulty. Additionally, the example seed panel generator 122 may replicate and/or down-sample seed panelists according to a replication parameter to increase and/or decrease the degrees of freedom of the final seed panel. The replication of the seed panelist are further described below in conjunction with FIG. 3. The example seed panel generator 122 stores the final seed panel in the example seed panel storage 126.

Figure 2:
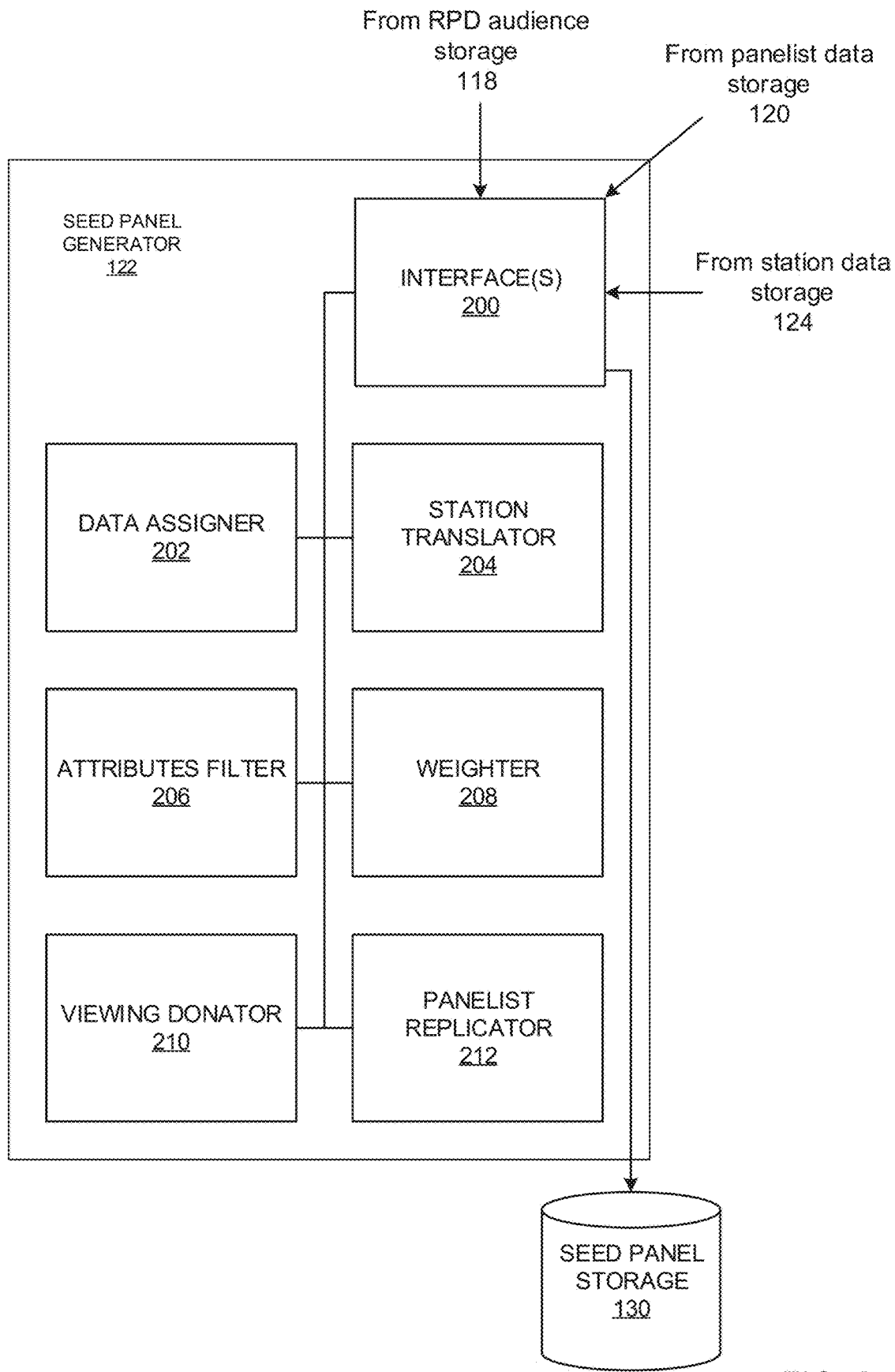
FIG. 2 is a block diagram of an example implementation of an example seed panel generator of FIG. 1.

FIG. 2 is a block diagram of an example implementation of the example seed panel generator 122 of FIG. 1 to generate a seed panel and output the seed panel to the example seed panel storage 126. The example seed panel generator 122 includes an example interface(s) 200, an example data assigner 202, an example station translator 204, an example attributes filter 206, an example weighter 208, an example viewing donator 210, and an example seed panelist replicator 212.

The example interface(s) 200 of FIG. 2 receives audience assigned return path data from the example return path data audience storage 118, meter data from the example panelist data storage 120, and/or station data from the example station data storage 124. Additionally, the example interface(s) 200 outputs the generated seed panel to the example seed panel storage 126. The example interface(s) 200 may be one interface capable of receiving and transmitting data to the example storages 118, 120, 124, 126 or may be multiple interfaces to interface with each, and/or any combination of, the example storages 118, 120, 124, 126. In some examples, the interface(s) 200 receive penalty coefficients from a user. The penalty coefficients are used to upweight and/or downweight the effect of certain constraints on each panelist's final penalty score. In this manner, a user can decide whether it is more important to converge on household targets as appose to demographic targets by setting the penalty coefficients.

The example data assigner 202 of FIG. 2 assigns geography data (e.g., county data) and income data to the audience assigned return path data audience and the monitored panelists corresponding to the example meter data 102. The example data assigner 202 uses designated marked area definitions by county, universe estimates for each county (e.g., number of homes, demographic composition of the homes, etc.), and/or demographics of seed panel homes to assign the geography data. Additionally or alternatively, the example data assigner 202 may assign geography data based on any grouping of land (e.g., city, state, etc.) The example data assigner 202 determines the geography data that will be assigned to the monitored panelists and the example audience assigned return path data audience by reducing error assigned to seed panel homes to counties in the designated market area based on probabilities of belonging to each country. In some examples, the data assigner 202 determines the geography data based on constraints, such as county capacity. The example data assigner 202 calculates the probability of a monitored panelist home belonging to a particular county based on comparison of seed panel demographics, demographics of the counties, universe estimates of the counties, and/or custom tabulations. To assign geography to an audience assigned return path data monitored panelist, the example data assigner 202 may generate the seed panel homes as supply nodes (e.g., representing items we want to assign or allocate), generate the counties as demand nodes (e.g., representing items we want supplies allocated to), and generate permissible assignments between the supply and demand nodes. The example data assigner 202 determines each cost for the permissible assignments and selects the geography assignment corresponding with the lowest cost. The example data assigner 202 of FIG. 2 assigns the income data based on the assigned county, postal codes, population distribution, income data, universe estimates, custom demographic data. In some examples, the data assigner 202 processes various data to assign income using a linear interpolation, full kernel estimate cumulative density function, and/or any other mathematical modelling. In some examples, the example data assigner 202 initiates the seed panel by selecting monitored panelists to represent the return path data audience based on a regional proximity to a designated market area, a similarity between demographics of the monitored panelist and demographics of the return path data audience location, household media characteristics (e.g., how the households receive television signals (cable, satellite, over-the-air radio, etc.)), a similarity between media consumption of the monitored panelists and the return path data audience, etc.

The example station translator 204 of FIG. 2 determines a station receivability list for the list of stations that are viewable by a particular audience member. The example return path data 100 may include the station receivability list and/or data corresponding to a station receivability list. However, meter data 102 may not include station receivability lists. To determine a station receivability list for the example media output device 110 of FIG. 1 (e.g., corresponding to over the air media), the example station translator 204 receives station data from the example station data storage 124 via the example interface(s) 200. The station data includes a list of viewable stations within a county. In some examples, the example station translator 204 translates viewing from the meter data 102 into a receivable station based on the station data.

The example attributes filter 206 of FIG. 2 filters the selected seed panelists to carry over certain attributes (e.g., person and/or household attributes) without any additional modeling. As described above, such attributes at the person level may include age, gender, ethnicity, nationality, race, etc. and such attributes at the household level may include head of household data, cable data, single set data, ADS data, county data, metro data, income, zip code, number of televisions, pay service data, etc.

The example weighter 208 of FIG. 2 weights the seed panelists according to the universe estimates. The seed panel may not accurately represent the total universe. Accordingly, the example weighter 208 weights the seed panelists so that the seed panel better represents the universe estimates. In this manner, the seed panelists are a statistically valid representation of the total universe of users.

The example viewing donator 210 of FIG. 2 donates viewing for out-of-tab seed panelists. A seed panelist is out-of-tab when, for example, the panelist's LPM 112 is off, broken, and/or otherwise faulty. Additionally, a seed panelist may be out-of-tab when the example return path data 100 is faulty or not being transmitted to the example AME 114. In such examples, the seed panelist may be watching the example media output device 108, 110, but not being credited for the viewing. Accordingly, the example viewing donator 210 determines when a seed panelist is out-of-tab and donates viewing data to represent the seed panelist until the seed panelist is back in-tab. Each seed panelist may have a corresponding donor pool of seed panelists and/or monitored panelists with similar demographics. When the example viewing donator 210 determines that the seed panelist is out-of-tab, the example viewing donator 210 selects a donor from the donor pool and uses the viewing data of the donor to represent the out-of-tab panelist.

The example seed panelist replicator 212 of FIG. 2 replicates and/or down-samples the seed panel prior to storing in the example seed panel storage 126. The example seed panelist replicator 212 replicates and/or down-samples to increase or decrease the degrees of freedom of the seed panel. In this manner, the seed panel can be more easily adjusted to satisfy target ratings and/or household target ratings. The example seed panelist replicator 212 replicates individual panelists data without modifying panelists viewing behavior within each replication. Any appropriate subsequent processing techniques or techniques can then be used to adjust the viewing behavior of the replicated panelists to further meet desired targets. The example seed panelist replicator 212 replicates a seed panelist by organizing the seed panel data to be solved in a constrained system of equations as shown in Equation 1.

$$AX=B \qquad \text{(Equation 1)}$$

In Equation 1, A is a matrix representing the seed panelists and their attributes, X is a column matrix representing the weight (e.g., duplication/replication factors) of the panelists, and B represents the aggregate totals for the attributes in the seed panel. Because data can only be replicated an integer number of times, the duplication/replication factors in X must be integer values. Accordingly, the example seed panelist replicator 212 determines the weights X solving an Integer Least Squares problem represented below in Equation 2.

$$\min_{x, \text{subject to } X \text{ being integers}} \|AX - B\|^2 \qquad \text{(Equation 2)}$$

In some examples, the generated seed panel is further optimized to meet other ratings constraints. Accordingly, the example seed panelist replicator 212 does not need to find an absolute global minimum solution to Equation 2, but rather, a reasonable local minimum which is computationally efficiently for large number of variables and constraints can be sufficient. The example seed panel replicator 212 is further described below in conjunction with FIG. 3.

Figure 3:
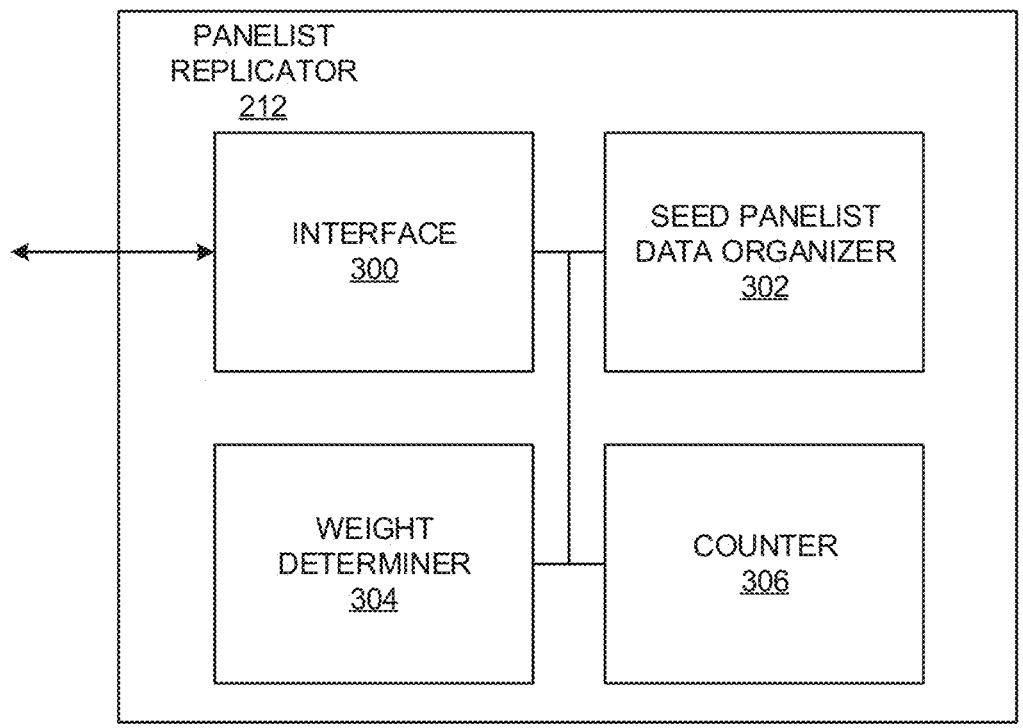
FIG. 3 is a block diagram of an example implementation of an example panelist replicator included in the example seed panel generator of FIG. 2.

FIG. 3 is block diagram of an example implementation of the example panelists replicator 212 of FIG. 2 to replicate individual panelist data without modifying their respective viewing behaviors with each duplication. The example seed panel optimizer 128 includes an example interface 300, an example seed panelist data organizer 302, an example weight determiner 304, and an example counter 306. Although the example panelist replicator 212 is described in conjunction with data generated by the example seed panel generator 122 of FIG. 1, the example panelist replicator 212 may replicate panelists based on information provided by any device that is capable of inputting panelist data and aggregate data. For example, the example panelist replicator 212 may replicate panelist based on any data that relates to a panelist attributes and corresponding aggregates (e.g., panelist data, survey data, etc.), regardless of whether the recorded audience is included in the population.

The example interface 300 of FIG. 3 receives the seed panel data from one or more of the example blocks 200-210 of FIG. 2. The seed panel data includes attributes (e.g., demographics) for seed panelists, initial weights (e.g., duplication factors) for the seed panelists, and/or seed panel aggregate data corresponding to the attributes. Alternatively, the interface 300 may receive attributes and aggregate data corresponding to any type of panel. The seed panel aggregate data corresponds to the total number of seed panelists that correspond to the particular attribute, the aggregate value of a given attribute across the seed panelists, etc. For example, if one of the attributes is gender, the seed panel aggregate data may include a total number of male seed panelists and a total number of female seed panelists. In another example, if one of the attributes is viewing minutes for a given panelist, the corresponding aggregate data is total viewing minutes over all the panelist. In some examples, the seed panelist data may not include the initial weights. In such examples, as further described below, the example seed panelist data organizer 302 may generate initial weights.

The example panelist data organizer 302 of FIG. 3 organizes the seed panel data received by the example interface 300. For example, the panelist data organizer 302 may organize the seed panel data to generate a panelist attribute matrix A, an initial weight matrix $X_0$, and an aggregate data matrix B to initiate the process of determining final weights X that replicate individual panelists, as described above in conjunction with Equations 1 and/or 2. For example, the panelist data organizer 302 may generate matrix A (e.g., panelist data matrix) such that each column represents a panelist and each row represents a corresponding attribute of the panelist. In such an example, if the panelist represented by a first row corresponds to an African-American male from a rural area, the panelist data organizer 302 will input a value (e.g., '1') in the rows representing African-American, male, and rural and input a second value (e.g., '0') for those attributes not corresponding to the panelist (e.g., urban, female, etc.).

Additionally, the example panelist data organizer 302 of FIG. 3 may generate the matrix B (e.g., aggregate data matrix) to correspond to the aggregate data of the attributes. For example, if gender is an attribute identified in the panel, the panelist data organizer 302 may have a value corresponding to the target total number of males to be represented by the panel and the target total number of females to be represented by the panel. In some examples, the example panelist data organizer 302 may generate the matrix Xo (e.g., the initial weight matrix) to correspond to the duplication factors (e.g., weights) that may be applied to the panelist data of A to substantially equal the aggregate data B. In some examples, the panelist data organizer 302 generates initial weights based on received initial weights. In other examples, when the initial weights are not received, the panelist data organizer 302 generates initial weights based on the seed panelist data and a minimum error value. To determine the minimum error value, the example panelist data organizer 302 assumes all initial weights $x_0$ in $X_0$ are equal. For example, the panelist data organizer 302 may generate some column matrix t, where each row is the sum of the attributes of each panelist. The example panelist data organizer 302 uses the below Equation 3 to determine the minimum error value based on the equal weights $x_0$.

$$m = \frac{\langle t, B \rangle}{\langle t, t \rangle}.$$ (Equation 3)

In Equation 3, $\langle a,b \rangle$ is the dot product of a and b. The example panelist organizer 302 uses the minimum error value m as the initial weights $x_0$ in $X_0$. The example panelist organizer 302 estimates panelist aggregate data (B_k) based on the seed panelist data matrix (A) and the initial weights ($X_0$).

The example weight determiner 304 of FIG. 3 determines the final weights x in X, such that Equation 2 is satisfied (e.g., a local minimum representing an acceptable duplication factor for each panelist is found). The example weight determiner 304 determines the final weights by iteratively cycling through the weights and looping through J iterations until a local minimum is found. For example, the weight determiner 304 selects a panelist from the seed panel and identifies the current weight estimates corresponding to the panelist (e.g., the initial weight for the first iteration). The example weight determiner 304 determines a weight adjustment (c) based on the below Equation 4.

$$c = \frac{\langle B - B_k, v_p \rangle}{\langle v_p, v_p \rangle}$$ (Equation 4)

In Equation 4, B is the received (e.g., actual) aggregate data, $B_k$ is the estimated aggregate data based on the current weight estimates, and $v_p$ is the attributes of the selected panelist. Once the weight adjustment is determined, the example weight determiner 304 adds the weight adjustment to the current weight estimate and rounds the sum to the nearest integer to generate the subsequent weight for the selected panelist. The example weight determiner 304 rounds the sum of the current weight estimate and the weight adjustment to ensure that the weights are integers. In some examples, the weight determiner 304 limits the subsequent weight between an upper bound (UB) and/or a lower bound (LB) (e.g., subsequent weight x=maximum[LB, minimum(round[current x+c], UB)]). In such examples, a lower bound may be set to '0' to allow for possible removal of the selected panelist or to '1' so that the panelist may not be removed. Additionally or alternatively, the lower bound for a particular seed panelist and/or a group of panelists may be set to a higher integer (e.g., '3') to ensure that each of the panelists is duplicated at least three times, for example. The upper bound determines the upper limit corresponding to the maximum allowance duplications for a panelist or a group of panelists. If the example weight determiner 304 determines that the subsequent weight estimate and the current weight estimate are the same, the example weight determiner 304 determines that the current weight estimate of the selected panelist is acceptable and the process repeats for a different panelist. If the example weight determiner 304 determines that the subsequent weight estimate and the current weight estimate are not the same, the example weight determiner 304 determines that the current weight estimate of the selected panelist is not acceptable and the process iteratively repeats using the subsequent weight for the panelist. Once the example weight determiner 304 determines that the weights of each of the panelists are acceptable, the example weight determiner 304 replicates the panelists based on the final weight estimates.

The example counter 306 of FIG. 3 tracks the number of panelists and/or number of iterations to determine the final weight estimates. The example counter 306 increments a first counter after each iterative weight estimation/adjustment and increments a second counter that tracks each panelist. In this manner, the first and second counters can be analyzed to determine when an acceptable weight for each panelist has been determined.

While an example manner of implementing the example panelist replicator 212 of FIG. 2 is illustrated in FIG. 3, one or more elements, processes and/or devices illustrated in FIG. 3 may be combined, divided, re-arranged, omitted, eliminated and/or implemented in any other way. Further, the example interface 300, the example seed panelist data organizer 302, the example weight determiner 304, the example counter 306, and/or, more generally, the example the example panelist replicator 212, of FIG. 3 may be implemented by hardware, machine readable instructions, software, firmware and/or any combination of hardware, machine readable instructions, software and/or firmware. Thus, for example, any of the example interface 300, the example seed panelist data organizer 302, the example weight determiner 304, the example counter 306, and/or, more generally, the example the example panelist replicator 212, of FIG. 3 could be implemented by one or more analog or digital circuit(s), logic circuit(s), programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example interface 300, the example seed panelist data organizer 302, the example weight determiner 304, the example counter 306, and/or, more generally, the example the example panelist replicator 212, of FIG. 3 is/are hereby expressly defined to include a tangible computer readable storage device or storage disk such as a memory, a digital versatile disk (DVD), a compact disk (CD), a Blu-ray disk, etc., storing the software and/or firmware. Further still, the example panelist replicator 212 of FIG. 3 may include one or more elements, processes and/or devices in addition to, or instead of, those illustrated in FIG. 3, and/or may include more than one of any or all of the illustrated elements, processes and devices.

Figure 4:
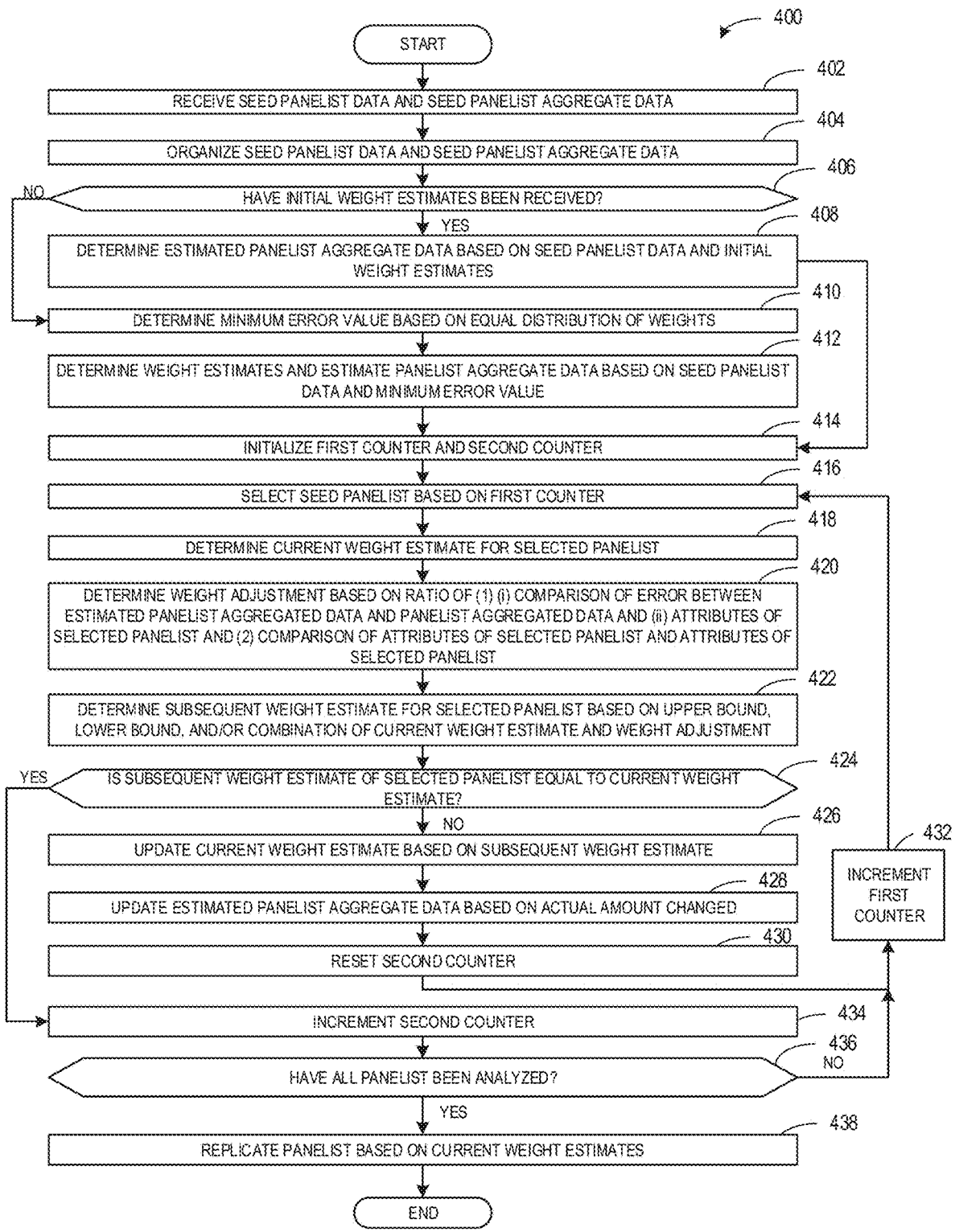
FIG. 4 is a flowchart illustrating example machine readable instructions that may be executed to implement the example panelist replicator of FIGS. 2 and/or 3.
Figure 5:
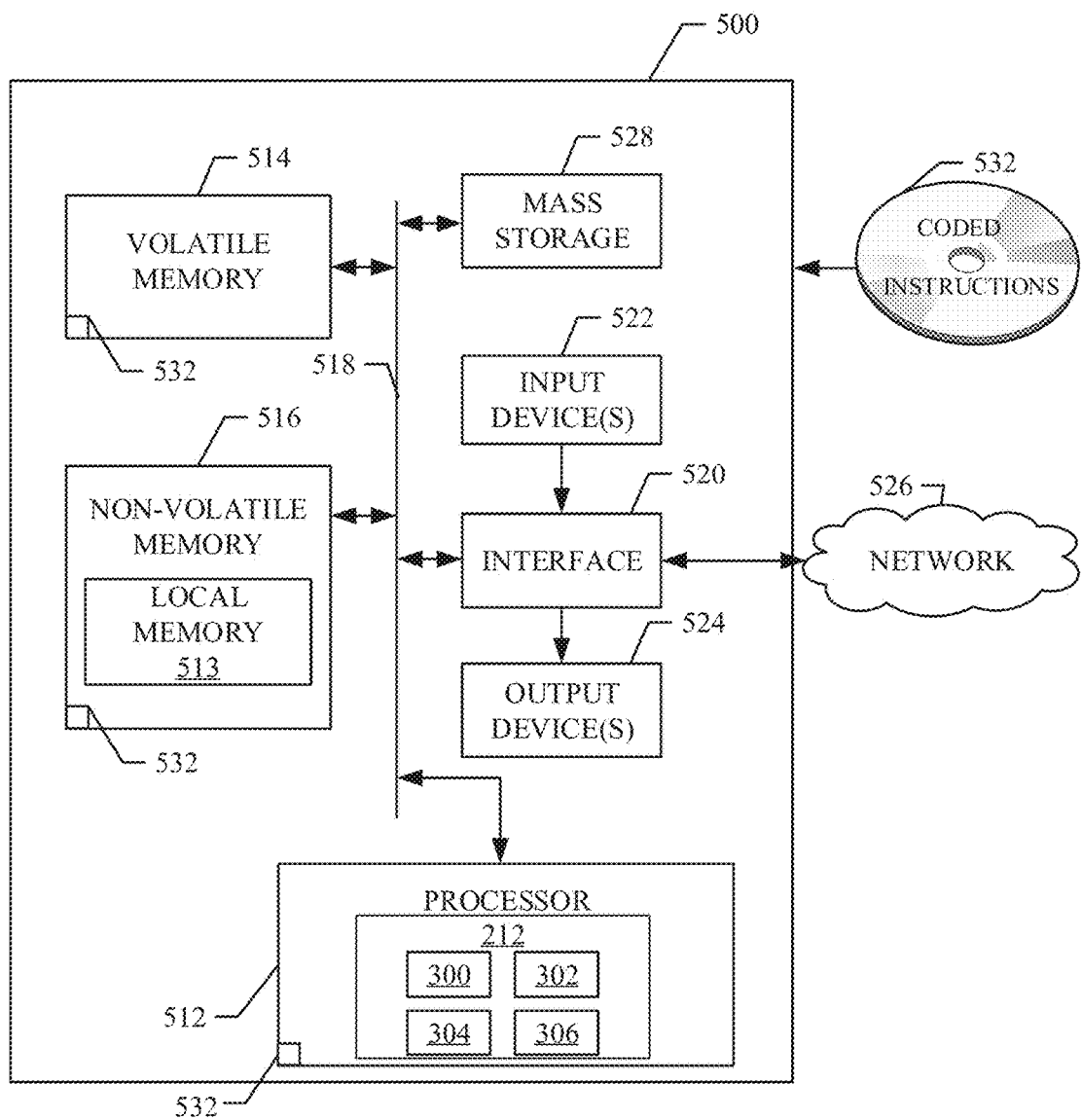
FIG. 5 is a block diagram of an example processing system structured to execute the example machine readable instructions of FIG. 4 to implement the example panelist replicator of FIGS. 2 and/or 3.

Flowcharts representative of example machine readable instructions for implementing the example panelist replicator 212 of FIG. 3 are shown in FIG. 4. In the examples, the machine readable instructions comprise a program for execution by a processor such as the processor 512 shown in the example processor platform 500 discussed below in connection with FIG. 5. The program may be embodied in software stored on a tangible computer readable storage medium such as a CD-ROM, a floppy disk, a hard drive, a digital versatile disk (DVD), a Blu-ray disk, or a memory associated with the processor 512, but the entire program and/or parts thereof could alternatively be executed by a device other than the processor 512 and/or embodied in firmware or dedicated hardware. Further, although the example program is described with reference to the flowcharts illustrated in FIG. 4, many other methods of implementing the example panelist replicator 212 of FIG. 3 may alternatively be used. For example, the order of execution of the blocks may be changed, and/or some of the blocks described may be changed, eliminated, or combined.

As mentioned above, the example process of FIG. 4 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any period (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example process of FIG. 4 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any period (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 4 is an example flowchart 400 representative of example machine readable instructions that may be executed by the example panelist replicator 212 of FIGS. 2 and 3 to replicate seed panelists. Although the instructions of FIG. 4 are described in conjunction with the example panelist replicator 212 of FIGS. 2 and 3, the example instructions may be utilized by any type of panelist replicator replicating any type of panelists.

At block 402, the example interface 300 receives seed panelist data and seed panelist aggregate data. At block 404, the example seed panelist data organizer 302 organizes the received seed panelist data and the received seed panelist aggregate data. For example, the seed panelist data organizer 302 may organize the seed panelist data in a seed panelist matrix A and the seed panelist aggregate data in an aggregate data matrix B, as described above in conjunction with FIG. 3.

At block 406, the example seed panelist data organizer 302 determines if the initial weight estimates ($X_0$) have been received by the example interface 300. If the example seed panelist data organizer 302 determines that the initial weight estimates ($X_0$) have been received (block 406: YES), the example seed panelist data organizer 302 determines estimated panelist aggregate data ($B_k$) based on seed panelist data and the received initial weight estimates (e.g., $B_k=A*X_0$) (block 408). If the example seed panelist data organizer 302 determines that the initial weight estimates ($X_0$) have not been received (block 406: NO), the example seed panelist data organizer 302 determines a minimum error value (m) based on an equal distribution of weights (block 410). As described above in conjunction with FIG. 3, the example seed panelist data organizer 302 determines the minimum error based on the above Equation 3.

At block 412, the example seed panelist data organizer 302 determines initial weight estimates ($X_0$) for the panelists and estimated panelists aggregate data ($B_k$) based on the seed panelist data and the minimum error value. For example, the seed panelist data organizer 302 determines the initial weights ($X_0$) by setting each initial weight $x_0$ in $X_0$ to be the minimum error value determined in block 410. The example panelist data organizer 302 estimates the panelist aggregate data ($B_k$) based on a product of the minimum error value and the sum of the attributes of the panelists (e.g., $B_k$=M*sum(row of A for each column)).

At block 414, the example counter 306 initializes a first counter (k) and a second counter (m). As described above in conjunction with FIG. 2, the first counter may track the iterations and the second count may track the panelists of A. At block 416, the example weight determiner 304 selects a seed panelist (e.g., pth seed panelist of A) based on the first counter. For example, the weight determiner 304 may determine which panelist to select based on a modulo operation corresponding to the fist counter and the total number of weights/panelists (e.g., p=mod(k,J)+1, where J is the total number of weights/panelists).

At block 418, the example weight determiner 304 determines the current weight estimate (current_$x_p$) for the selected panelist. For example, initially the current weight estimate for the selected panelist is the initial weight ($x_0$) corresponding to the panelist. However, the current weight changes with each iteration until the weight converges to the final weight. At block 420, the example weight determiner 304 determines a weight adjustment (c) for the current weight for the panelist based on a ratio of (1)(i) a comparison (e.g., dot product) of the error between the estimated panelist aggregate data ($B_k$) and the actual panelist aggregate data (B) and (ii) attributes of the selected panelist ($v_p$) and (2) a comparison (e.g., dot product) of attributes of the selected panelist and attributes of the selected panelist, as shown in the above in Equation 4.

At block 422, the example weight determiner 304 determines a subsequent weight estimate (sub_$x_p$) for the selected panelist based on an upper bound, a lower bound, and/or a combination (e.g., sum) of the current weight estimate (current_$x_p$) and the weight adjustment (c) (e.g., sub_$x_p$=maximum[LB, minimum(round[current x+c], UB)]). As described above, the example weight determiner 304 rounds the sum of the current weight estimate and the weight adjustment to ensure that the weights are integers.

At block 424, the example weight determiner 304 determines if the subsequent weight estimate of the selected panelist is equal to the current weight estimate. If the subsequent weight estimate is equal to the current weight estimate, the current weight is an acceptable weight that satisfies (e.g., is at least an acceptable local minimum solution for) the above Equation 1. If the example weight determiner 304 determines that the subsequent weight estimate of the selected panelist is not equal to the current weight of the selected panelist (block 424: NO), the example weight determiner 304 updates the current weight estimate based on the determined subsequent weight estimate (e.g., set current_$x_d$=sub_$x_d$) (block 426). At block 428, the example weight determiner 304 updates the estimate panelist aggregate data based on the actual amount changed (e.g., $B_k$=$B_k$+(sub_$x_d$-current_$x_d$)$v_p$). At block 430, the example counter 306 resets the second counter (m=0). The example counter 306 resets the second counter to continue to iteratively estimate the weight for the selected panelist until the weight estimate is acceptable. At block 432, the example counter 308 increments the first counter for an additional iteration. After block 432, the process returns to clock 416 for an additional iteration until all weights for all panelists are acceptable.

If the example weight determiner 304 determines that the subsequent weight estimate of the selected panelist is equal to the current weight of the selected panelist (block 424: YES), the example counter 306 increments the second counter to identify that the panelist's weight estimate is acceptable (block 434). At block 436, the example weight determiner 304 determines if all panelists have been analyzed (e.g., the second counter=the total number of panelists). If the example weight determiner 304 determines that all panelists have not been analyzed (block 436: NO), the process returns to block 432 to continue to iterate until the final weight estimates of all panelists have been determined. If the example weight determiner 304 determines that all panelists have been analyzed (block 436: YES), the example weight determiner 304 replicates the panelists based on the current (e.g., final) weight estimates (block 438).

The processor platform 500 of the illustrated example includes a processor 512. The processor 512 of the illustrated example is hardware. For example, the processor 512 can be implemented by integrated circuits, logic circuits, microprocessors or controllers from any desired family or manufacturer.

The processor 512 of the illustrated example includes a local memory 513 (e.g., a cache). The example processor 512 of FIG. 5 executes the instructions of FIG. 4 to the example interface 300, the example seed panelist data organizer 302, the example weight determiner 304, and the example counter 306 to implement the example panelist replicator 212 of FIG. 3. The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), and/or a PCI express interface.

In the illustrated example, one or more input devices 522 are connected to the interface circuit 520. The input device(s) 522 permit(s) a user to enter data and commands into the processor 512. The input device(s) can be implemented by, for example, a sensor, a microphone, a camera (still or video), a keyboard, a button, a mouse, a touchscreen, a track-pad, a trackball, isopoint and/or a voice recognition system.

One or more output devices 524 are also connected to the interface circuit 520 of the illustrated example. The output devices 524 can be implemented, for example, by display devices (e.g., a light emitting diode (LED), an organic light emitting diode (OLED), a liquid crystal display, a cathode ray tube display (CRT), a touchscreen, a tactile output device, and/or speakers). The interface circuit 520 of the illustrated example, thus, typically includes a graphics driver card, a graphics driver circuit or a graphics driver processor.

The interface circuit 520 of the illustrated example also includes a communication device such as a transmitter, a receiver, a transceiver, a modem and/or network interface card to facilitate exchange of data with external machines (e.g., computing devices of any kind) via a network 526 (e.g., an Ethernet connection, a digital subscriber line (DSL), a telephone line, coaxial cable, a cellular telephone system, etc.).

The processor platform 500 of the illustrated example also includes one or more mass storage devices 528 for storing software and/or data. Examples of such mass storage devices 528 include floppy disk drives, hard drive disks, compact disk drives, Blu-ray disk drives, RAID systems, and digital versatile disk (DVD) drives.

The coded instructions 532 of FIG. 4 may be stored in the mass storage device 528, in the volatile memory 514, in the non-volatile memory 516, and/or on a removable tangible computer readable storage medium such as a CD or DVD.

From the foregoing, it should be appreciated that the above disclosed methods, apparatus, and articles of manufacture replicate panelists using a local minimum solution of an integer least square problem. Example disclosed herein process the collected and/or aggregated metering data for markets where a panel is maintained and collect and/or aggregate return path data for markets where a panel is not maintained to generate a seed panel. In some examples, the seed panelists need to be replicated and/or down sampled to more accurately represent a population. Examples disclosed herein replicate individual panelists without modifying their respective viewing behavior with each duplication. Examples disclosed herein replicate panelists without the need to solve a system of equations, use matrix multiplication, or invoke non-linear optimization procedures. In this manner, examples disclosed herein are able to replicate panelists in panels with millions of attributes and/or panelists, which was not previously attainable using today's computers.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. An apparatus comprising:
    memory; and
    processor circuitry to execute computer readable instructions to:
       determine weight adjustments based on a ratio of (A) a first dot product of (i) attribute data and (ii) a difference between first aggregate panelist data and second seed panelist data, and (B) a second dot product of the attribute data and the attribute data, the first aggregate panelist data based on the attribute data, the attribute data corresponding to a seed panel;
       determine weight estimates based on the weight adjustments, the weight estimates to replicate respective seed panelists in the seed panel; and
       replicate respective ones of the seed panelists based on the weight estimates to generate a synthetic audience representative of return path data reported by a plurality of media devices.

2. The apparatus of claim 1, wherein the processor circuitry is to determine the first aggregate panelist data by combining attributes of seed panelists of the seed panel according to the weight estimates.

3. The apparatus of claim 1, wherein the processor circuitry is to:
    determine an error based on an equal distribution of initial weights; and
    set respective ones of the weight estimates based on the error.

4. The apparatus of claim 1, wherein the weight estimates are adjusted weight estimates, and the processor circuitry is to:
    access an initial weight estimate corresponding to a first one of the seed panelists;
    determine a first weight adjustment for the first one of the seed panelists;
    determine a first one of the adjusted weight estimates for the first one of the seed panelists; and
    when the first one of the adjusted weight estimates is not substantially equal to the initial weight estimate:
       update the initial weight estimate based on the first one of the adjusted weight estimates; and
       update the first aggregate panelist data based on a difference between the initial weight estimate and the first one of the adjusted weight estimates.

5. The apparatus of claim 4, wherein the initial weight estimate is a first initial weight estimate, and when the first initial weight estimate is substantially equal to the first one of the adjusted weight estimates, the processor circuitry is to adjust a second initial weight for a second one of the seed panelists.

6. The apparatus of claim 4, wherein the processor circuitry is to determine the first weight adjustment for the first one of the seed panelists based on a comparison of an aggregated data error and attributes of the first one of the seed panelists.

7. The apparatus of claim 6, wherein the aggregated data error corresponds to a difference between the first aggregate panelist data and input aggregate panelist data.

8. An apparatus comprising:
    means for obtaining first aggregate panelist data and second seed panelist data; and
    means for generating a synthetic audience, the means for generating to:
       determine weight adjustments based on a ratio of (A) a first dot product of (i) attribute data and (ii) a difference between the first aggregate panelist data based and the second seed panelist data, and (B) a second dot product of the attribute data and the attribute data, the first aggregate panelist data based on the attribute data, the attribute data corresponding to a seed panel;
       determine weight estimates based on the weight adjustments, the weight estimates to replicate respective seed panelists in the seed panel; and
       replicate respective ones of the seed panelists based on the weight estimates to generate the synthetic audience, the synthetic audience representative of return path data reported by a plurality of media devices.

9. The apparatus of claim 8, wherein the means for generating is to determine the first aggregate panelist data by combining attributes of seed panelists of the seed panel according to the weight estimates.

10. The apparatus of claim 8, wherein the means for generating is to:
    determining an error based on an equal distribution of initial weights; and
    setting respective ones of the weight estimates based on the error.

11. The apparatus of claim 8, wherein the weight estimates are adjusted weight estimates, and the means for generating is to:
   access an initial weight estimate corresponding to a first one of the seed panelists;
   determine a first weight adjustment for the first one of the seed panelists;
   determine a first one of the adjusted weight estimates for the first one of the seed panelists; and
   when the first one of the adjusted weight estimates is not substantially equal to the initial weight estimate:
      update the initial weight estimate based on the first one of the adjusted weight estimates; and
      update the first aggregate panelist data based on a difference between the initial weight estimate and the first one of the adjusted weight estimates.

12. The apparatus of claim 11, wherein the initial weight estimate is a first initial weight estimate, and when the first initial weight estimate is substantially equal to the first one of the adjusted weight estimates, the means for generating is to adjust a second initial weight estimates for a second one of the seed panelists.

13. The apparatus of claim 11, wherein the means for generating is to determine the first weight adjustment for the first one of the seed panelists based on a comparison of an aggregated data error and attributes of the first one of the seed panelists.

14. The apparatus of claim 13, wherein the aggregated data error corresponds to a difference between the first aggregate panelist data and input aggregate panelist data.

15. A non-transitory computer readable medium comprising instructions which, when executed, cause one or more processors to at least:
   determine weight adjustments based on a ratio of (A) a first dot product of (i) attribute data and (ii) a difference between first aggregate panelist data and second seed panelist data, and (B) a second dot product of the attribute data and the attribute data, the first aggregate panelist data based on the attribute data, the attribute data corresponding to a seed panel;
   determine weight estimates based on the weight adjustments, the weight estimates to replicate respective seed panelists in the seed panel; and
   replicate respective ones of the seed panelists based on the weight estimates to generate a synthetic audience representative of return path data reported by a plurality of media devices.

16. The non-transitory computer readable medium of claim 15, wherein the instructions cause the one or more processors to determine the first aggregate panelist data by combining attributes of seed panelists of the seed panel according to the weight estimates.

17. The non-transitory computer readable medium of claim 15, wherein the weight estimates are adjusted weight estimates, and the instructions to cause the one or more processors to:
   access an initial weight estimate corresponding to a first one of the seed panelists;
   determine a first weight adjustment for the first one of the seed panelists;
   determine a first one of the adjusted weight estimates for the first one of the seed panelists; and
   when the first one of the adjusted weight estimates is not substantially equal to the initial weight estimate:
      update the initial weight estimate based on the first one of the adjusted weight estimates; and
      update the first aggregate panelist data based on a difference between the initial weight estimate and the first one of the adjusted weight estimates.

18. The non-transitory computer readable medium of claim 17, wherein the initial weight estimate is a first initial weight estimate, and when the first initial weight estimate is substantially equal to the first one of the adjusted weight estimates, the instructions to cause the one or more processors to adjust a second initial weight for a second one of the seed panelists.

19. The non-transitory computer readable medium of claim 17, wherein the instructions cause the one or more processors to determine the first weight adjustment for the first one of the seed panelists based on a comparison of an aggregated data error and attributes of the first one of the seed panelists.

20. The non-transitory computer readable medium of claim 15, wherein the instructions cause the one or more processors to:
   determine an error based on an equal distribution of initial weights; and
   set respective ones of the weight estimates based on the error.

* * * * *